Aug. 27, 1935.  E. L. HUBBARD  2,012,511
LIQUID GAUGE AND SYSTEM
Filed Jan. 21, 1930
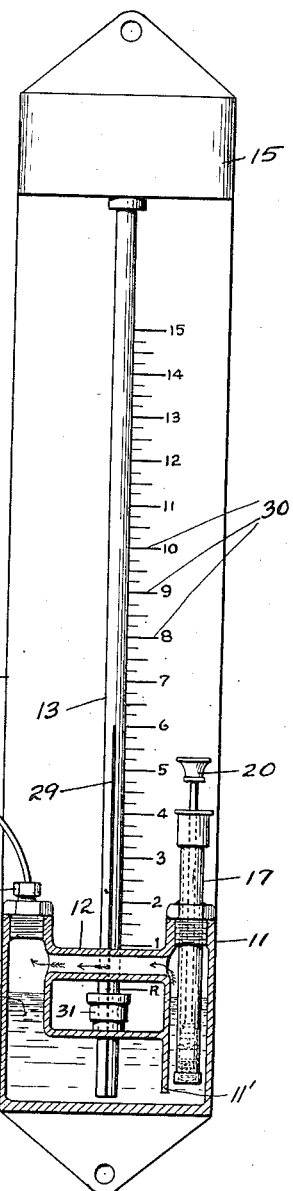
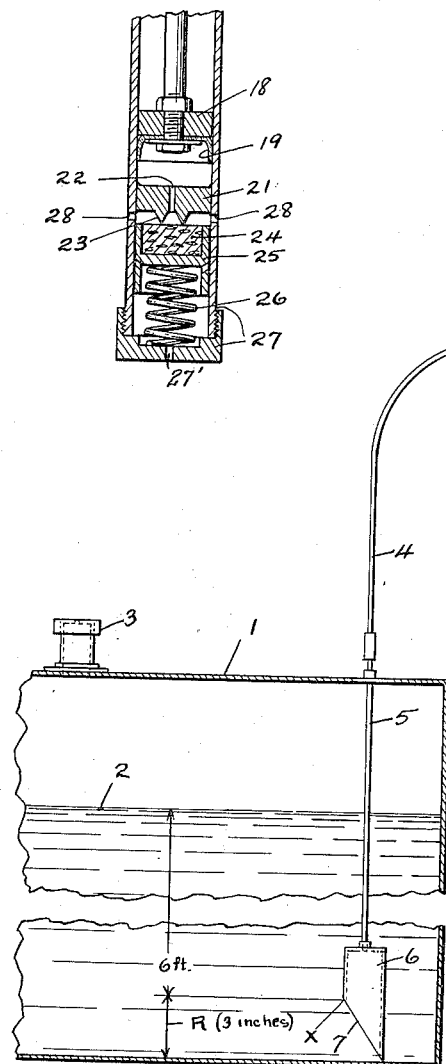
INVENTOR.
EDWARD L. HUBBARD
BY Miller Boyken & Brief
ATTORNEYS.

Patented Aug. 27, 1935

2,012,511

UNITED STATES PATENT OFFICE 2,012,511

LIQUID GAUGE AND SYSTEM

Edward L. Hubbard, Piedmont, Calif., assignor to Water Works Supply Company, San Francisco, Calif., a corporation of California Application January 21, 1930, Serial No. 422,247

4 Claims. (Cl. 73—54)

This invention relates to liquid depth gauges of the manometer type and has for its objects improvements in such apparatus for gauging the depths of liquids.

In the drawing annexed hereto Fig. 1 is an elevation partly in section showing my gauge apparatus connected to an underground tank and indicating the depth of its contained liquid.

Fig. 2 is an enlarged sectional view of the special pump valve construction used in the apparatus.

In further detail the drawing shows a buried tank 1 of any size and containing say a total depth of liquid 2 of six feet three inches as indicated. The tank has a vented filling plug at 3 and is connected to the gauge proper by a small tube 4 which connects to the upper end of a vertical pipe 5 carrying at its lower end an enlarged chamber or cylinder 6 cut off at an angle at 7 so that its point touches the bottom of the tank and the upper end of the angular cut is about two or three inches above the bottom as indicated at R in Fig. 1.

The gauge comprises a frame 8 provided at its lower end with a chamber 9 preferably made of brass and which chamber has two risers 10 and 11 cross connected near their upper ends by a transverse passageway 12, while between the risers and to the rear of the passageway 12 is a vertical glass reading tube 13 passing air tight into the chamber through a stuffing box 31 and terminating at its lower end within the liquid 14 near the bottom of the chamber 9, and at its upper end in an overflow chamber 15 vented to atmosphere.

Stuffing box 31 is preferably packed with cork and it should be noted that it is positioned below the level of the gauging liquid 14 so that it need seal liquid only.

Tube 4 from the tank connects air tight at 16 to the upper end of riser 10, and fitted into the upper end of riser 11 is an air pump for pumping air into the system for forcing all liquid down and out of pipe 5 and chamber 6 to the three-inch line or highest part (X) of the slanted opening in chamber 6.

The pump comprises a brass cylinder 17 sealed or screwed air tight into the upper end of riser 11 and is fitted inside with a plunger 18 having a packer 19 and an operating pump handle 20. The packer 19 functions as an intake valve, since it contracts sufficiently on the up stroke to permit air to leak downward around the plunger 18, and on the down stroke it is expanded by the back pressure and forms an air-tight seal against the inner walls of the cylinder 17, after the manner of the well known bicycle pump. The lower head 21 of the cylinder is pierced by a small central hole 22 about a sixteenth of an inch in diameter surrounded on its lower end by a short nipple forming a valve seat 23 against which seats a cork 24 held in a vertically reciprocable cage 25 pressed upward by a spring 26 and vented against trapping air, all as best shown in Fig. 2.

The valve housing 27 is ported at its lower end 27' to the liquid 14 so that the cage 25 can move up and down freely, and is also ported just under the head 21 as indicated at 28 to permit the escape of the air forced down by the pump.

Ports 28 are at such an elevation and guarded by wall 11' of the chamber 9 in such a manner that the air cannot find its way across the chamber 9 to bubble up under riser 10, but must ascend riser 11 and then pass over through lateral passage riser 12 to riser 10, thus overcoming any tendency to violently carry liquid spray over into tube 4 or affect the gauge column 29 of liquid in reading tube 13.

With an arrangement of the kind so far described it is manifest that upon pumping a pressure of air into the system to displace all liquid from pipe 5 the pressure will have to balance the weight of liquid above point X in the tank and hence will also balance a liquid gauge column 29 of equal height if the gauge liquid is of equal specific gravity, or of lesser height if the gauge liquid 14 is heavier, it being the ordinary practice in gauges of this kind to use a gauging liquid much heavier than the liquid to be gauged, so that the reading column will be kept short.

Therefore, since gauges of the type herein shown are used to gauge the depth of various liquids such as water, gasoline, fuel oil, alcohol, lubricating oil of various weights, and many other liquids, it follows that if any particular liquid were chosen for the gauging liquid it would have a different specific gravity relation to each different liquid to be gauged and would therefore require a special graduation of the depth scale 30 for each liquid to which it was applied, also for gauging very heavy liquids, say sulfuric acid, the instrument would have to be several times as long as for gauging gasoline. Thus, for every installation it would be necessary to ascertain the specific gravity of the liquid to be gauged, compute its relation to the specific gravity of the gauge column liquid and engrave the scale especially to suit. In lieu of this, a large line of instruments must be carried.

In an attempt to overcome the difficulty mentioned and be able to meet any gauging requirement with one size of instrument with a single uniform scale I discovered that if the gauging liquid 14 is compounded of two or more dissimilar weight liquids, say a heavy one and a light one that are perfectly miscible, that the proper relation of a single scale to any liquid to be gauged can be maintained regardless of its weight, in other words, instead of using a given gauging liquid to balance liquids of varying weight I vary the weight of my gauging liquid to maintain the same ratio to the weight of the liquid to be gauged and hence a single graduated reading scale drawn to the same proportions will be correct for all liquids.

As suitable liquids to carry out the invention I have found a mixture of acetyl-tetra-bromide (tetrabromothane) with transformer oil to be very satisfactory as they are both non-volatile and since their specific gravities are respectively about 2.9823 and .8816 it will be seen that a scale of substantially 3 to 1 may be maintained over a wide range (using the acetyl-tetra-bromide pure in gauging water) or if a longer reading scale is desired I may mix suitable quantities to make a 2½ or 2 to 1 weight ratio, but whichever ratio is adopted will handle all liquids within a reasonable range with but the one reading scale.

Instead of the above liquids I may use a mixture of ethylene (specific gravity 2.16) with a non-volatile mineral oil of any chosen weight for a diluent, or any two dissimilar weight liquids which are perfectly miscible as are the above such as alcohol and bromoform, or I may vary the weight of a given liquid such as water by dissolving various amounts of a heavy metallic salt such as silver nitrate therein. The principal feature of importance being to vary the weight of the gauging liquid to compensate for the particular weight of the liquid to be gauged so as to read correctly on a fixed scale drawn to some arbitrary relation to give a desired length of reading column.

The construction of the pump valve of cork I have found necessary in using the first mixture above described as other pliable substances useful for valves are speedily ruined by the liquid and hence the specific construction of the apparatus has a relation to the specific liquids used.

In practice pipe 5 is kept a short distance above the bottom of the tank to be gauged to allow for sludge or foreign matter which may settle in the liquid. This lower stratum or residue is termed R in the drawing and on the gauge column and its depth is determined by the angular cutting off of cylinder 6 which establishes the point X or effective lower end of pipe 5. Cylinder 6 being large takes care of the effect of heat and cold on tube 4 since the bore of this tube is very small and its capacity relative to capacity of cylinder 6 is therefore negligible.

Having thus described my invention and the manner of its use, I claim:

1. In a pressure gauge, a gauge column, a chamber for the gauge column liquid at the base of the column and communicating near its bottom with the column, a pair of risers on said chamber, and a cross duct connecting the risers above the level of the gauging liquid, one of said risers being provided with a pressure pipe connection from the liquid to be gauged, and the other with means for introducing a gas under pressure.

2. In a pressure gauge, a gauge column, a chamber for the gauge column liquid at the base of the column and communicating near its bottom with the column, a pair of risers on said chamber, and a cross duct connecting the risers above the level of the gauging liquid, one of said risers provided with a pressure pipe connection from the liquid to be gauged, and a cylindrical air pump extending within the other said riser and discharging below the surface of the liquid level therein.

3. A device for indicating the level of liquid in a tank, which comprises, a tube of transparent material, there being a measuring scale adjacent the tube, a chamber containing gauging liquid connected to the bottom of the tube, two nipples on the top of said chamber, a duct interconnecting said nipples above the level of the gauging liquid, an air pump mounted in one of said nipples and having its discharge end projecting into the gauging liquid in said chamber, and a tube in communication with the liquid adjacent the bottom of the tank and connected to the other of said nipples.

4. A device for indicating the level of liquid in a tank, which comprises, a tube of transparent material, there being a measuring scale adjacent the tube, a chamber containing gauging liquid connected to the bottom of the tube, two nipples on the top of said chamber, a duct interconnecting said nipples above the level of the gauging liquid, an air pump mounted in one of said nipples and having its discharge end projecting into the gauging liquid in said chamber, a tube in communication with the liquid adjacent the bottom of the tank and connected to the other of said nipples, and an open chamber on the upper end of and communicating with the tube for receiving the overflow liquid from the tube.

EDWARD L. HUBBARD.